United States Patent
Franconi

(10) Patent No.: US 8,850,827 B2
(45) Date of Patent: Oct. 7, 2014

(54) CONTROL VALVE WITH RADIAL SEALS

(75) Inventor: Robert Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 1191 days.

(21) Appl. No.: 12/718,665

(22) Filed: Mar. 5, 2010

(65) Prior Publication Data

US 2011/0217157 A1 Sep. 8, 2011

(51) Int. Cl.
- F02C 6/04 (2006.01)
- F16K 15/00 (2006.01)
- F16K 17/00 (2006.01)
- F16K 21/04 (2006.01)
- F16K 25/00 (2006.01)
- F16K 17/04 (2006.01)
- F01D 3/00 (2006.01)

(52) U.S. Cl.
CPC .. F01D 3/00 (2013.01); F16K 17/04 (2013.01)
USPC .............................. 60/785; 137/540; 251/182

(58) Field of Classification Search
USPC ............ 60/540, 543.15, 514.5; 137/785, 782, 137/806; 251/282
See application file for complete search history.

(56) References Cited

U.S. PATENT DOCUMENTS

| | | | |
|---|---|---|---|
| 704,557 A | 7/1902 | Michener | |
| 2,296,492 A * | 9/1942 | Begley, Sr. | 137/512.1 |
| 3,416,561 A | 12/1968 | Kokaly | |
| 3,684,238 A | 8/1972 | Michellone et al. | |
| 3,923,075 A | 12/1975 | Farrell | |
| 4,296,599 A * | 10/1981 | Adamson | 60/39.23 |
| 4,472,107 A | 9/1984 | Chang et al. | |
| 5,497,975 A * | 3/1996 | Achmad | 251/129.07 |
| 6,067,791 A | 5/2000 | Patel | |
| 6,648,010 B1 * | 11/2003 | Goodwin | 137/493.1 |
| 6,779,554 B2 | 8/2004 | Weis et al. | |
| 7,559,696 B2 | 7/2009 | Oncina et al. | |
| 2002/0189263 A1 * | 12/2002 | Rayer et al. | 60/782 |
| 2003/0026714 A1 | 2/2003 | Bosen | |
| 2007/0289643 A1 | 12/2007 | Knapp | |

* cited by examiner

Primary Examiner — Phutthiwat Wongwian
Assistant Examiner — William Breazeal
(74) Attorney, Agent, or Firm — Ingrassia Fisher & Lorenz, P.C.

(57) ABSTRACT

A control valve is provided that includes a valve body, a valve element, a first radial seal, and a second radial seal. The valve body forms an inlet, an outlet, and a fluid flow passage therebetween. The valve element is disposed at least partially within the valve body, and is movable between at least a closed position and an open position. When the valve element is in the closed position, fluid is restricted from flowing through the fluid flow passage. When the valve element is in the open position, the fluid is allowed to flow through the fluid flow passage. The first radial seal is disposed against the valve body at a first distance from a centerline of the control valve. The second radial seal is disposed against the valve body at a second distance from the centerline, the second distance being greater than the first distance.

20 Claims, 6 Drawing Sheets

CONTROL VALVE WITH RADIAL SEALS

TECHNICAL FIELD

The present invention generally relates to a control valve, and more particularly relates to a control valve with radial seals, such as for controlling air flow in a gas turbine engine of an airplane.

BACKGROUND

Valves are used to control gases or other fluids in various types of apparatus and vehicles, such as aircraft. For example, valves may be used to control the supply of air between a compressor and a turbine of a gas turbine engine, and to thereby control the supply of air to bearings for thrust balancing of the gas turbine engine, for example, in aircraft. In certain applications, for example during takeoff of aircraft, it may be desirable to control the supply of air, for example to the bearings, such that air flows only when there is a relatively high inlet pressure, and such that air flows at a relatively large volume once a sufficient inlet pressure is attained. It may also be desirable to be able to vary the inlet pressure at which the air is supplied. In addition, for valves having a spring, it may be desirable to reduce the size and/or weight of the spring needed to operate the valve.

Accordingly, it is desirable to provide a valve for air control, such as in a gas turbine engine of an airplane, that opens only when there is a relatively high inlet pressure and/or at a relatively large volume once the relatively high inlet pressure is attained, and/or that can be adjusted to vary the inlet pressure at which the air is supplied, and/or for which a relatively smaller spring can be utilized. It is further desirable to provide a gas turbine engine, such as in an airplane, having a valve for air control, that opens only when there is a relatively high inlet pressure and/or at a relatively large volume once the relatively high inlet pressure is attained, and/or that can be adjusted to vary the inlet pressure at which the air is supplied, and/or for which a relatively small spring can be utilized.

BRIEF SUMMARY

In accordance with an exemplary embodiment, a control valve is provided. The control valve comprises a valve body, a valve element, a first radial seal, and a second radial seal. The valve body forms an inlet, an outlet, and a fluid flow passage therebetween. The valve element is disposed at least partially within the valve body, and is movable between at least a closed position and an open position. When the valve element is in the closed position, fluid is restricted from flowing through the fluid flow passage. When the valve element is in the open position, the fluid is allowed to flow through the fluid flow passage. The first radial seal is disposed against the valve body at a first distance from a centerline of the control valve. The second radial seal is disposed against the valve body at a second distance from the centerline, the second distance being greater than the first distance.

In accordance with another exemplary embodiment, a control valve is provided. The control valve comprises a valve body, a valve element, a first radial seal, and a second radial seal. The valve body forms an inlet, an outlet, and a fluid flow passage therebetween. The valve element is disposed at least partially within the valve body. The valve element has a first end and a second end, and is movable between at least a closed position and an open position. When the valve element is in the closed position, fluid is restricted from flowing through the fluid flow passage. When the valve element is in the open position, fluid is allowed to flow through the fluid flow passage. The first radial seal is disposed against the first end of the valve element. The second radial seal is disposed against the second end of the valve element.

In accordance with another exemplary embodiment, a gas turbine engine is provided. The gas turbine engine includes a compressor, a combustor, a turbine, and a control valve. The compressor has an inlet and an outlet, and is operable to supply compressed air. The combustor is coupled to receive a first portion of the compressed air from the compressor, and is operable to supply combusted air. The turbine is coupled to receive the combusted air from the combustor and a second portion of the compressed air from the compressor. The control valve is coupled between the compressor and the combustor. The control valve comprises a valve body, a valve element, a first radial seal, and a second radial seal. The valve body forms an inlet, an outlet, and a fluid flow passage therebetween. The valve element is disposed at least partially within the valve body, and is movable between at least a closed position and an open position. When the valve element is in the closed position, the second portion of the compressed air is restricted from flowing through the fluid flow passage. When the valve element is in the open position, the second portion of the compressed air is allowed to flow through the fluid flow passage. The first radial seal is disposed against the valve body at a first distance from a centerline of the control valve. The second radial seal is disposed against the valve body at a second distance from the centerline, the second distance being greater than the first distance.

Other desirable features and characteristics of the control valve and gas turbine engine will be apparent from the subsequent detailed description and the appended claims, taken in conjunction with the accompanying drawings and the foregoing technical field and background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by the preceding background or the following detailed description.

Figure 1:
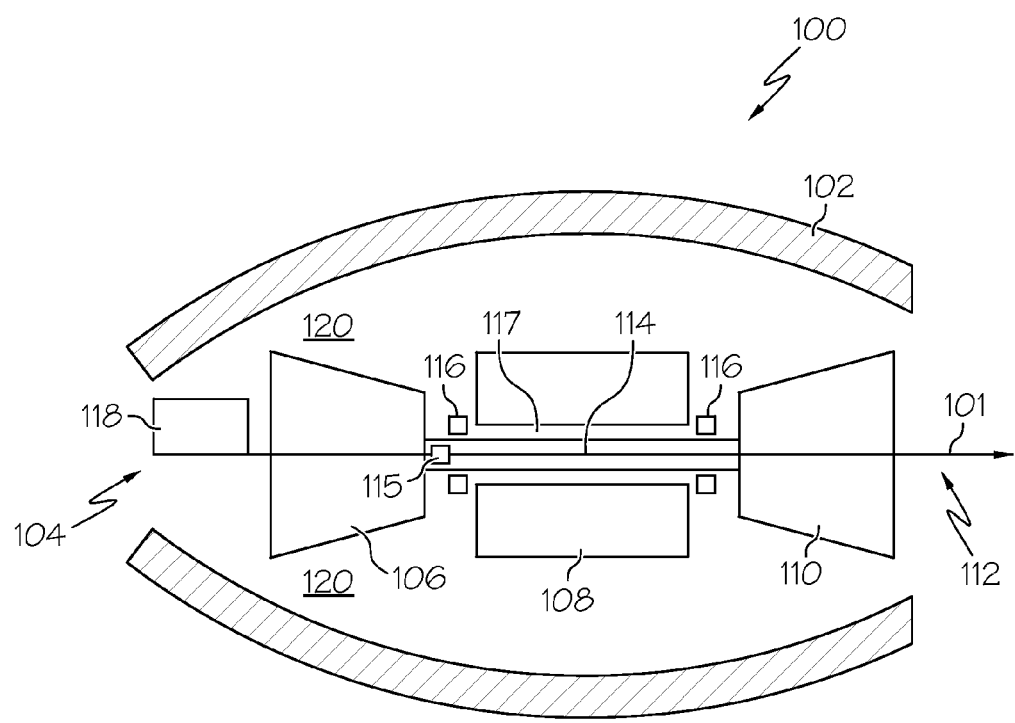
FIG. 1 is a schematic diagram of a gas turbine engine, such as in an airplane, in accordance with an exemplary embodiment.

FIG. 1 depicts a schematic diagram of an exemplary embodiment of a gas turbine engine 100. As shown in FIG. 1, the gas turbine engine 100 is annular around an axis 101. The gas turbine engine 100 includes a housing 102, an intake section 104, a compressor section 106, a combustion section 108, a turbine section 110, an exhaust section 112, a rotor assembly 114, a control valve 115, and bearings 116.

The intake section 104 is disposed within the housing 102. The intake section 104 includes a fan 118, which is preferably mounted in a fan case inside the housing 102. The fan 118 draws air into the intake section 104 and accelerates it. A fraction of the accelerated air exhausted from the fan 118 is directed through a bypass section 120 disposed between the fan case and an engine cowl, and provides a forward thrust. The remaining fraction of air exhausted from the fan 118 is directed into the compressor section 106.

The compressor section 106 is also disposed within the housing 102, and includes at least one compressor. The compressor section 106 may include a combination of one or more high pressure compressors, intermediate pressure compressors, and/or low pressure compressors. The compressor(s) of the compressor section 106 receive air directed by the intake section 104, compress the air, and direct a first portion of the compressed air (preferably, a majority of the compressed air) into the combustion section 108. In addition, a second portion of the compressed air bypasses the combustion section 108 and is provided to cool, among other components, the turbine blades in the turbine section 110 as well as the rotor assembly 114 and the bearings 116.

The turbine section 110 is disposed within the housing 102, and includes at least one turbine. The turbine section 110 may include a combination of one or more high pressure turbines, intermediate pressure turbines, and/or low pressure turbines. The high-temperature combusted air from the combustion section 108 expands through the turbine(s), causing the turbine(s) to rotate. The air is then exhausted through the exhaust section 112, providing additional forward thrust. As the turbine(s) rotate, the turbine(s) drive equipment in the gas turbine engine 100 via the rotor assembly 114. The turbine(s) of the turbine section 110 each include a plurality of stators (not shown in FIG. 1) and turbine blades (not shown in FIG. 1). The stators are used to direct a portion of the combusted air from the combustion section 108 onto the rotary blades. The rotary blades in turn cause the associated turbine(s) to rotate.

The rotor assembly 114 is preferably disposed within a chamber 117 formed within the housing 102. The rotor assembly 114 preferable includes concentrically disposed shafts or spools that are used by the turbine section 110 to drive equipment in the turbine section 110. The bearings 116 are also disposed within the chamber 117, and preferably support the rotor assembly 114 both axially and radially.

The control valve 115 is also disposed within the housing 102, proximate the chamber 117. The control valve 115 controls the flow of the second portion of the compressed air from the compressor section 106 into the chamber 117, which counteracts the thrust load on the bearings 116 in the chamber 117 during high pressure conditions (such as takeoff of an airplane) and acts in a pressure area facing aft of the engine.

FIGS. 2-3 and 5-6 are schematic diagrams of the control valve 115 of the gas turbine engine 100 of FIG. 1, in accordance with two exemplary embodiments. In both exemplary embodiments, the control valve 115 includes a valve element, an outer radial seal, and an inner radial seal.

Figure 2:
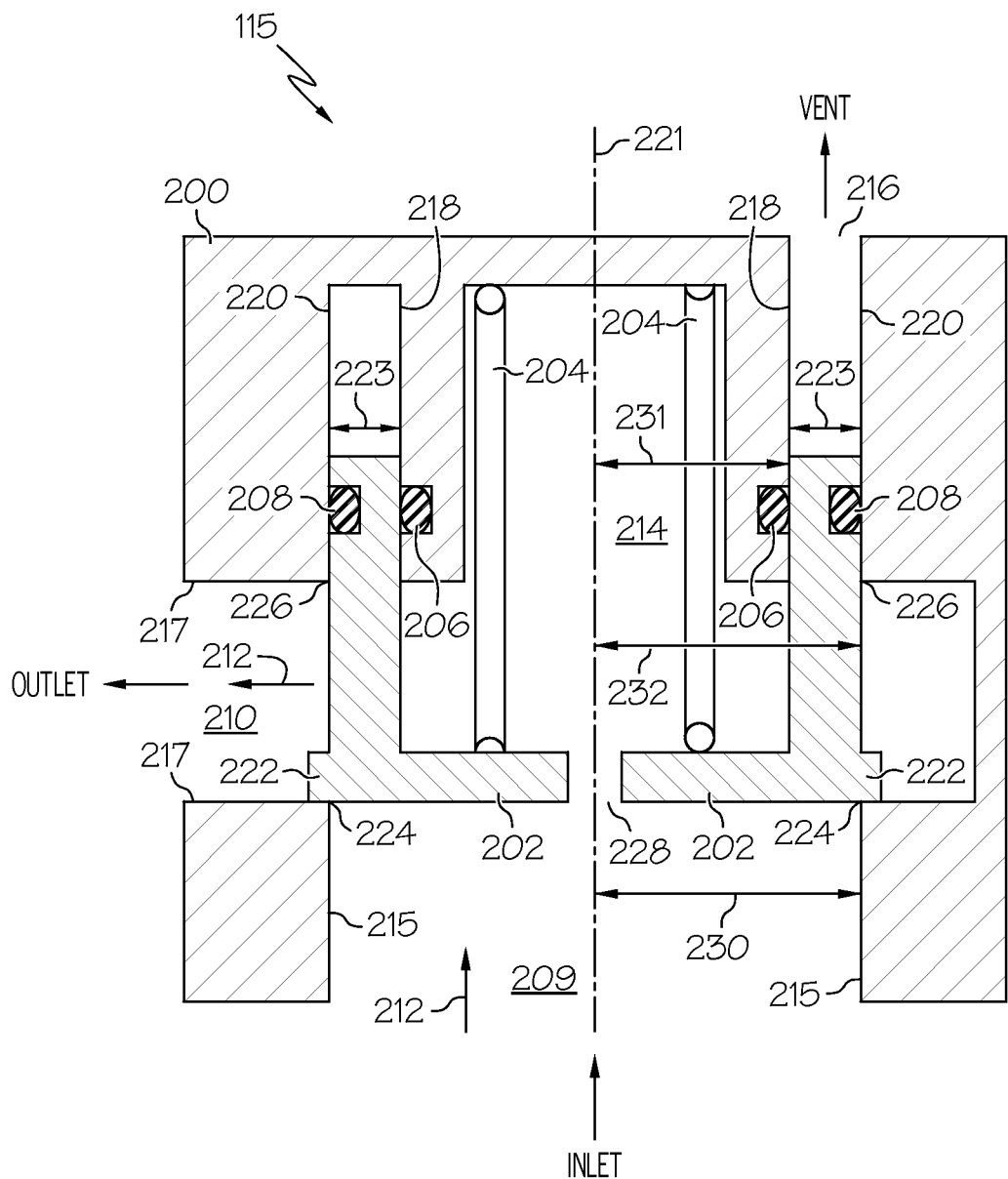
FIG. 2 is a schematic diagram of a control valve that can be implemented in connection with the gas turbine engine of FIG. 1, depicted in a closed position, in accordance with a first exemplary embodiment in which the control valve has a poppet for a valve element.
Figure 3:
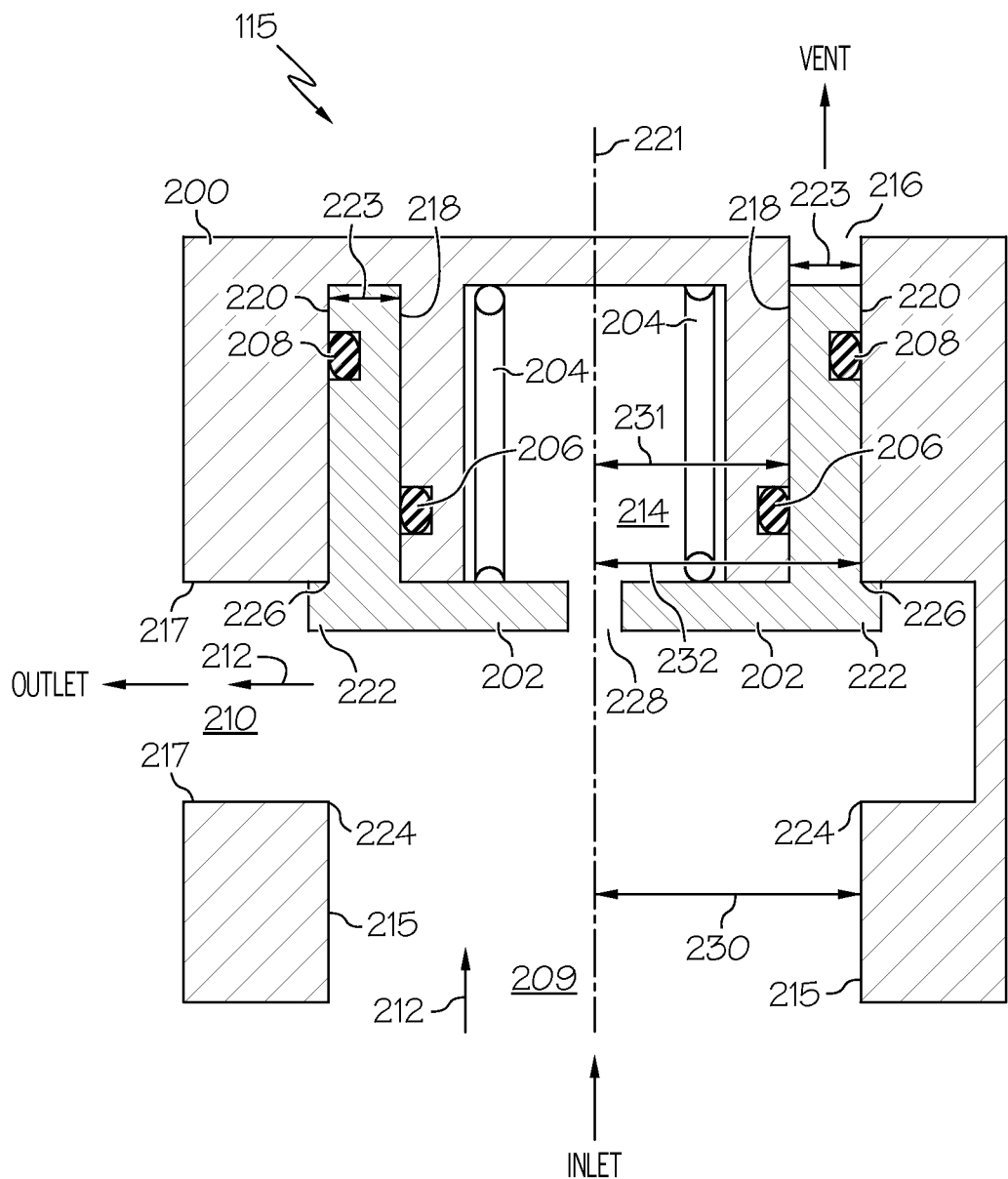
FIG. 3 is a schematic diagram of the control valve of the embodiment of FIG. 2, depicted in an open position in accordance with an exemplary embodiment.
Figure 5:
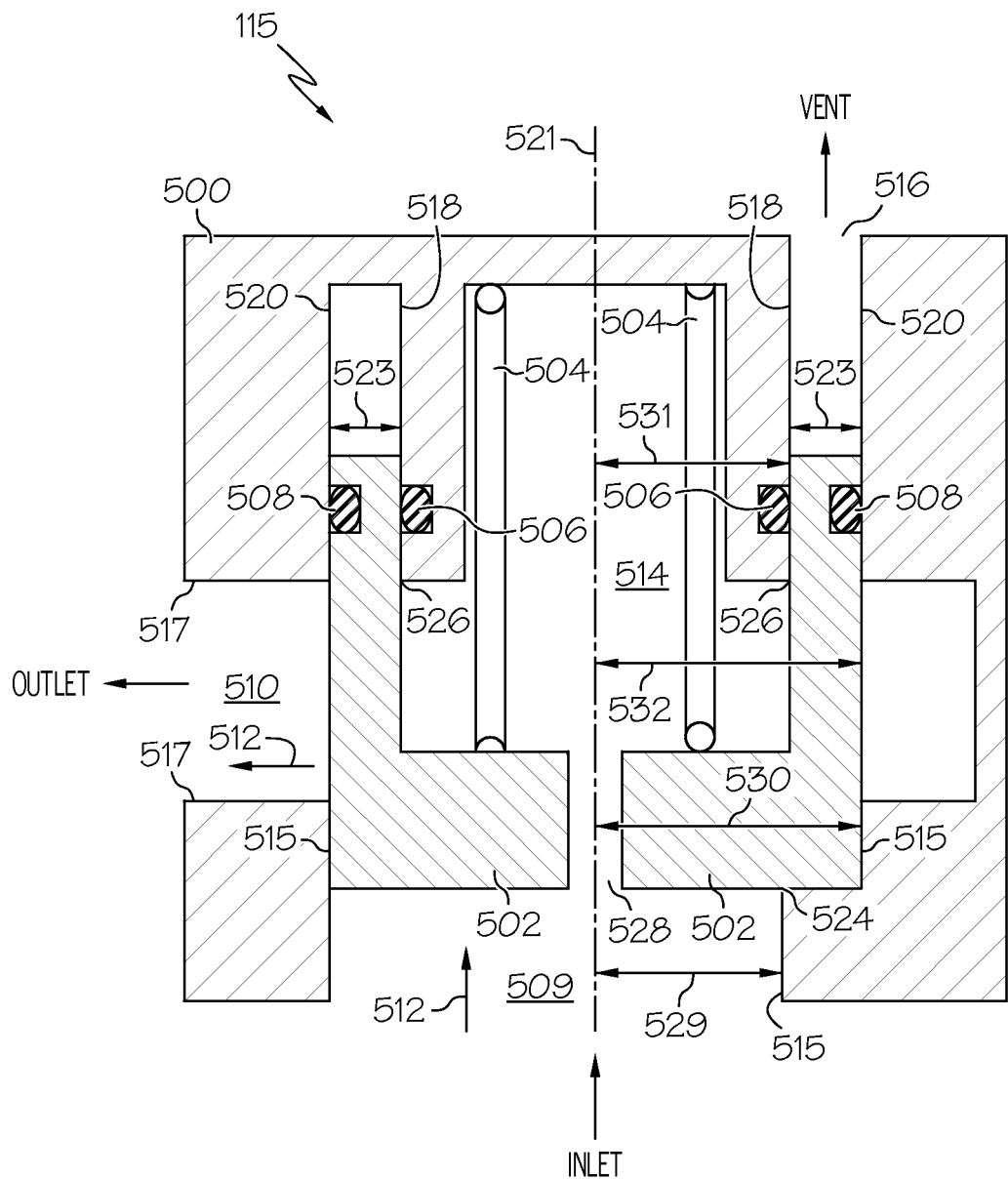
FIG. 5 is a schematic diagram of a control valve that can be implemented in connection with the gas turbine engine of FIG. 1, depicted in a closed position, in accordance with a second exemplary embodiment in which the control valve has a sleeve for a valve element.
Figure 6:
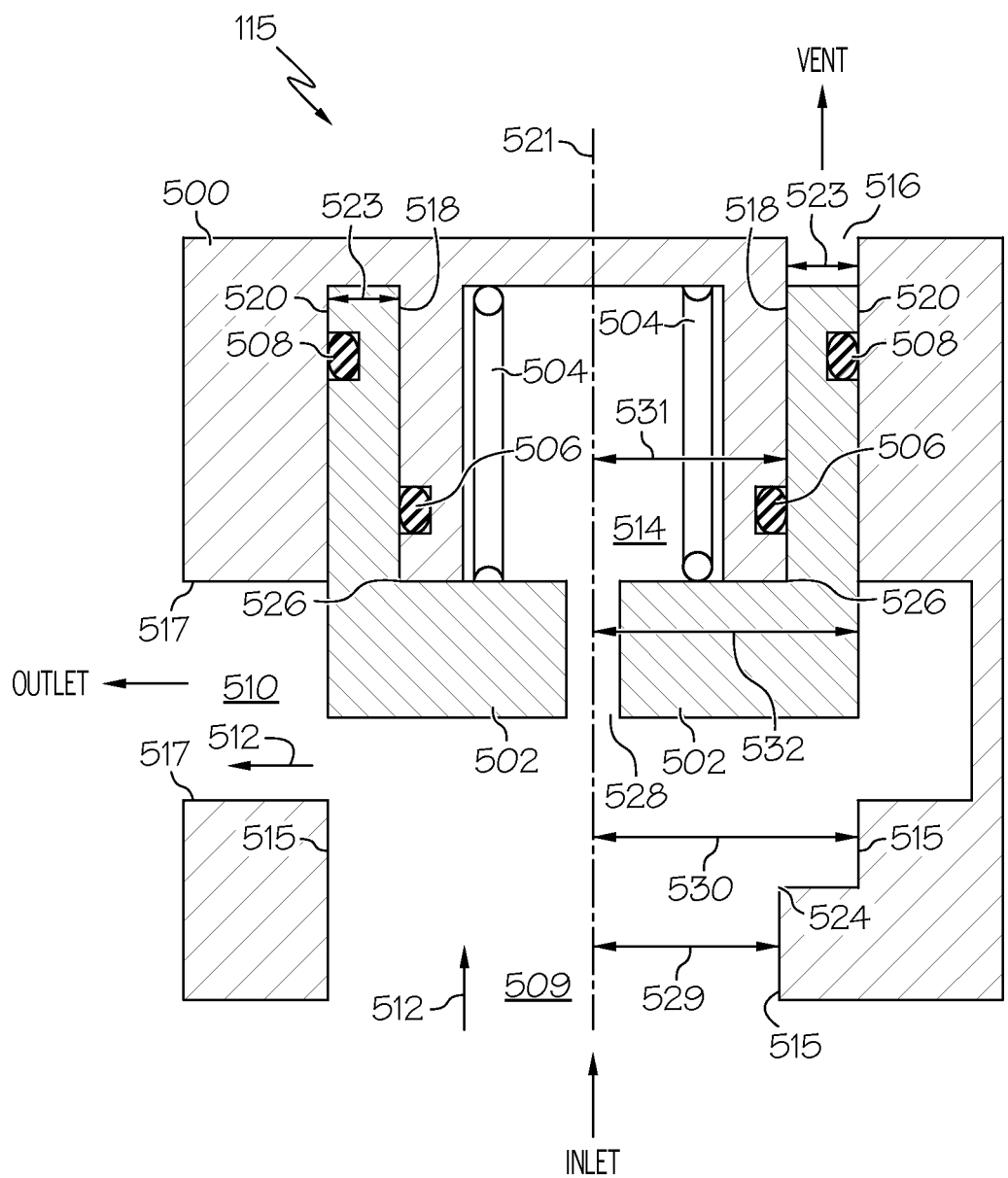
FIG. 6 is a schematic diagram of the control valve of the embodiment of FIG. 5, depicted in an open position, in accordance with an exemplary embodiment.

FIGS. 2 and 3 depict a first embodiment of the control valve 115 of FIG. 1 in which the valve element comprises a poppet. Specifically, FIG. 2 depicts the control valve 115 in a closed position, and FIG. 3 depicts the control valve 115 in an open position, in accordance with a first exemplary embodiment in which the valve element comprises a poppet. FIGS. 5 and 6 depict a second embodiment of the control valve 115 of FIG. 1 in which the valve element comprises a sleeve. Specifically, FIG. 5 depicts the control valve 115 in a closed position, and FIG. 6 depicts the control valve 115 in an open position, in accordance with a second exemplary embodiment in which the valve element comprises a sleeve.

Turning first to the first exemplary embodiment of FIGS. 2 and 3, the control valve 115 includes a valve body 200, a poppet 202, a spring 204, an inner radial seal 206, and an outer radial seal 208. The valve body 200 forms an inlet 209, an outlet 210, and a fluid flow passage 212 therebetween. Preferably the inlet 209 is coupled to receive the second portion of the compressed air from the compressor section 106 of FIG. 1, and the outlet 210 is coupled to selectively allow the flow of the second portion of the compressed air to the rotor assembly 114, the bearings 116, and the turbine section 110 of FIG. 1.

In the depicted embodiment, the valve body 200 includes a first wall 215 that defines the inlet 209 therebetween, and a second wall 217 that defines the outlet 210 therebetween. The first wall 215 is preferably parallel to a centerline 221 of the control valve 115, and the second wall 217 is preferably perpendicular to the centerline 221. As shown in FIGS. 2 and 3, the first wall is a distance 230 from the centerline 221. For this embodiment, the distance 230 represents a length of an imaginary line that is perpendicular to and terminates at both the centerline 221 and the first wall 215. Also in the depicted embodiment, the valve body 200 forms a chamber 214 within a portion of the valve body 200, and also forms a vent 216 by which fluid may be vented, for example to an ambient environment.

The poppet 202 is movably disposed within at least a portion of the valve body 200. The poppet 202 is movable between at least an open position and a closed position. When the poppet 202 is in the closed position (depicted in FIG. 2), fluid is restricted from flowing through the fluid flow passage 212. As used herein, fluid is "restricted from flowing" when the flow rate of the fluid is less than ten percent of the flow rate when the poppet 202 is in the open position. In a most preferred embodiment, the fluid is prevented from flowing through the fluid flow passage 212 when the poppet 202 is in the closed position. Conversely, when the poppet 202 is in the open position (depicted in FIG. 3), fluid is allowed to flow freely through the fluid flow passage 212. Specifically, with reference to FIG. 1, the second portion of the compressed air from the compressor section 106 of FIG. 1 is allowed to flow freely through the fluid flow passage 212 toward the rotor assembly 114, the bearings, 116, and the turbine section 110 when the poppet 202 is in the open position of FIG. 3, but not when the poppet 202 in the closed position of FIG. 2.

In the depicted embodiment, the poppet 202 includes a first end, or inner end, 218, and a second end, or outer end, 220. The inner end 218 is disposed relatively closer to the centerline 221 of the control valve 115, and the outer end 220 is disposed relatively farther from the centerline 221.

In addition, the poppet 202 preferably includes a protrusion 222 extending from a portion of the outer end 220 in a lower region of the poppet 202 proximate the inlet 209. The protrusion 222 contacts a first seat 224 formed by the valve body 200 when the poppet 202 reaches the closed position (as depicted in FIG. 2), and the poppet 202 rests against the first seat 224 when in the closed position. The protrusion 222 contacts a second seat 226 formed by the valve body 200 when the poppet 202 reaches the open position (as depicted in FIG. 3), and the poppet 202 rests against the second seat 226 when in the open position.

Also in the depicted embodiment, the poppet 202 includes an orifice 228 near a middle region of the poppet 202 surrounding the centerline 221 of the control valve 115. The orifice 228 fluidly couples the inlet 209 with the chamber 214. The orifice 228 allows a relatively small amount of fluid (as compared with the amount of fluid flowing through the fluid flow passage 212 when the poppet 202 is in the open position) to flow into the chamber 214. This relatively small amount of fluid fills the chamber 214, and pressure balances a portion of the poppet 202.

The spring 204 is disposed within at least a portion of the valve body 200, and preferably within the chamber 214 allowing for an efficiently packaged assembly. In a preferred embodiment, the spring 204 is nested in the housing 200 within the chamber 214 and surrounded by the poppet 202, as shown in FIGS. 2 and 3.

The spring 204 exerts a spring force against the poppet 202. Specifically, the spring 204 exerts the spring force against the poppet 202 in a first direction that urges the poppet 202 toward the closed position of FIG. 2. The poppet 202 receives an inlet flow pressure in a second direction, opposite the first direction, that opposes the spring force and urges the poppet 202 toward the open position. When the inlet pressure multiplied by the differential area of annulus 223 exceeds the spring force, the poppet 202 is moved toward the open position. Conversely, when the spring force exceeds the inlet pressure, the poppet 202 is moved toward the closed position.

The inner radial seal 206 is disposed within the valve body 200 proximate the inner end 218 of the poppet 202. Specifically, preferably the inner radial seal 206 extends radially around the centerline 221 of the control valve 115 against and adjacent to a portion of the inner end 218 of the poppet 202 and a portion of the valve body 200, as depicted in FIGS. 2 and 3. The inner radial seal 206 is a distance 231 from the centerline 221. For this embodiment, the distance 231 represents a length of an imaginary line that is perpendicular to and terminates at both the centerline 221 and the inner radial seal 206. As the poppet 202 moves between the open and closed positions, the inner radial seal 206 remains stationary as the poppet 202 moves adjacent to the inner radial seal 206.

The outer radial seal 208 is disposed against a portion of the valve body 200 proximate the outer end 220 of the poppet 202. Specifically, preferably the outer radial seal 208 extends radially around the centerline 221 of the control valve 115 against and adjacent to a portion of the outer end 220 of the poppet 202 and a portion of the valve body 200, as depicted in FIGS. 2 and 3. The outer radial seal 208 is a distance 232 from the centerline 221. For this embodiment, the distance 232 represents a length of an imaginary line that is perpendicular to and terminates at both the centerline 221 and the outer radial seal 208. The outer radial seal 208 is relatively farther from the centerline 221 than is the inner radial seal 206. Alternatively stated, distance 232 is greater than distance 231, and the diameter of the outer radial seal 208 (equal to twice the distance 232) is greater than the diameter of the inner radial seal 206 (equal to twice the distance 231).

The outer radial seal 208 is preferably the same distance from the centerline 221 as is the first wall 215 of the valve body 200 that forms the inlet 209. Alternatively stated, distance 232 is preferably equal to distance 230, and the diameter of the outer radial seal 208 (equal to twice the distance 231) is preferably the same as the diameter of the inlet 209 (equal to twice the distance 230). As such, the outer radial seal 208 has the same effective area as the seat region for the control valve 115, and variations in downstream pressure do not affect operation of the control valve 115.

The inner radial seal 206 is a dynamic seal. As the poppet 202 moves between the open and closed positions, the inner radial seal 206 remains stationary as the poppet 202 moves along and over the inner radial seal 206.

The inner and outer radial seals 206, 208 are used in parallel to pressure balance a portion of the seat area of the control valve 115 and to prevent leakage or unwanted flow of fluid, for example out the vent 216, between the inner and outer ends 218, 220 of the poppet 202. Accordingly, the inlet fluid pressure applied against the poppet 202 is effectively exerted against a region of the poppet 202 with an area extending a distance 223 between the inner and outer ends 218, 220 of the poppet 202. As depicted in FIG. 2, the distance 223 is preferably equal to a width of a portion of the poppet 202 against which the inner and outer radial seals 206, 208 are disposed.

Accordingly, the control valve 115 has a relatively small effective area against which the inlet pressure is applied (as compared with a traditional poppet control valve or sleeve control valve), due to the positioning of the inner and outer radial seals 206, 208. In one embodiment, this allows for the control valve 115 to be configured to remain closed until the inlet pressure exceeds a very high threshold, for example during takeoff of an airplane, and also allows for the control valve 115 to fully open very quickly with a large effective area after the inlet pressure exceeds this threshold. This in turn can improve the lifespan of the rotor assembly 114 and the bearings 116 of FIG. 1 and conserve fuel consumption, for example because the rotor assembly 114 and the bearings 116 of FIG. 1 only experience fluid pressure when necessary, for example during takeoff of an airplane.

Figure 4:
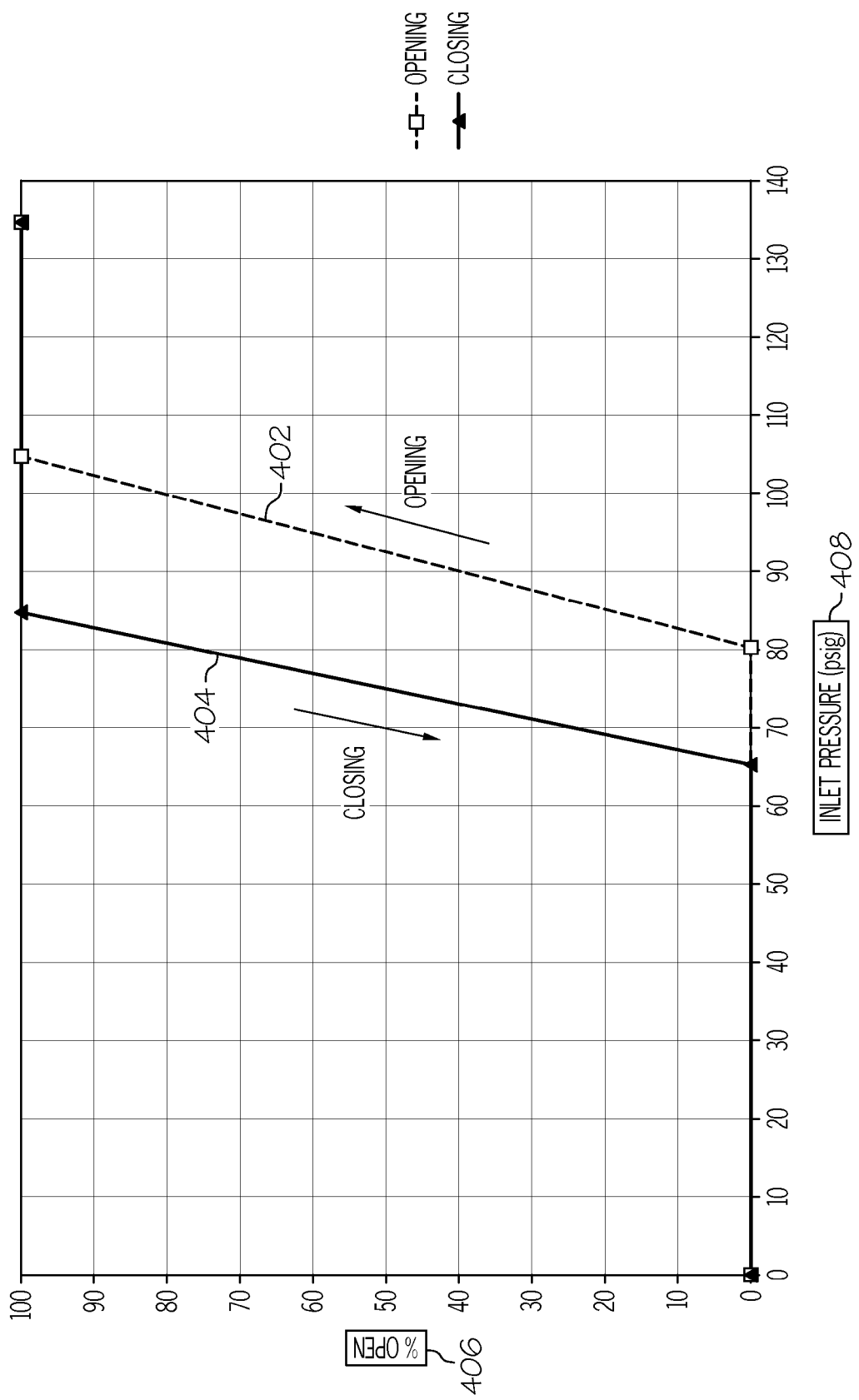
FIG. 4 is a graphical representation of exemplary operating bands for opening and closing of the control valve of FIGS. 2 and 3 (and that can also be used to represent operating bands for opening and closing the control valve in the exemplary embodiment of FIGS. 5 and 6), in accordance with an exemplary embodiment.

FIG. 4 provides exemplary operating bands for opening and closing of the exemplary embodiment of the control valve 115 and poppet 202 of FIGS. 2 and 3 (and that may also be used to represent exemplary operating bands of the embodiment of the control valve 115 and poppet 502 of FIGS. 5 and 6, described further below), in accordance with an exemplary embodiment. Specifically, FIG. 4 depicts an opening curve 402 and a closing curve 404 for the control valve 115 and poppet 202 of FIGS. 2 and 3 illustrating the percentage 406 in which the control valve 115 and the poppet 202 are open as a function of the inlet pressure 408, in accordance with an exemplary embodiment. In the embodiment of FIG. 4, the control valve 115 (specifically, the poppet 202 thereof) begins to open at 80 psi and reaches its fully open position (the position depicted in FIG. 3) at 105 psi. However, this may vary in other embodiments. Also in this exemplary embodiment, the control valve 115 begins to close at 85 psi, and reaches its fully closed position (the position depicted in FIG. 2) at 65 psi. However, this may also vary in other embodiments.

In certain embodiments, the first wall 215 of the valve body 200 may be adjusted. For example, the first wall 215 may be moved inward toward the centerline 221, to thereby reduce the distance 230 and correspondingly the diameter of the inlet 209 (which is equal to twice the distance 230). Such movement of the first wall 215 inward toward the centerline 221 would effectively shift the opening and closing curves 402, 404 (for example, by shifting the opening and closing curves 402, 404 closer to one another, in one exemplary embodiment), to thereby adjust the inlet pressures at which the control valve 115 and the poppet 202 of FIGS. 2 and 3 open and close.

Having generally described the control valve 115, a more detailed description of the operation of a particular embodiment of the control valve 115 will now be described, assuming that the poppet 202 is initially in the closed position of FIG. 2. In this position, the poppet 202 is spring loaded against the first seat 224 by the spring 204, and the poppet 202 experiences inlet pressure against an effective area of the poppet 202 between the outer radial seal 208 and the inner radial seal 206.

Once sufficient inlet pressure is applied through the inlet 209, the poppet 202 begins to open against the spring 204 toward the open position of FIG. 3, and fluid begins to flow through the fluid flow passage 212. As the inlet pressure continues to increase and the poppet 202 reaches a specified point, the protrusion 222 of the poppet 202 contacts the second seat 226, and the poppet 202 reaches the open position of FIG. 3. While in the open position, the poppet 202 rests against the second seat 226, and fluid is allowed to flow freely through the fluid flow passage 212.

Once the inlet pressure is reduced by a sufficient amount, the spring 204 begins to move the poppet 202 toward the closed position of FIG. 2. As the inlet pressure continues to decrease and the poppet 202 reaches another specified point, the protrusion 222 of the poppet 202 contacts the first seat 224, and the poppet 202 reaches the closed position of FIG. 2. While in the closed position, the poppet 202 rests against the first seat 224, and fluid is restricted (and preferably prevented) from flowing freely through the fluid flow passage 212. In addition, while the poppet 202 is in various intermediate positions between the open position of FIG. 3 and the closed position of FIG. 2, fluid is preferably allowed to flow through the fluid flow passage but less freely as compared to when the poppet 202 is in the fully open position of FIG. 3.

Turning now to the second exemplary embodiment of FIGS. 5 and 6, the control valve 115 includes a valve body 500, a sleeve 502, a spring 504, an inner radial seal 506, and an outer radial seal 508. The valve body 500 forms an inlet 509, an outlet 510, and a fluid flow passage 512 therebetween. Preferably the inlet 509 is coupled to receive the second portion of the compressed air from the compressor section 106 of FIG. 1, and the outlet 510 is coupled to selectively allow the flow of the second portion of the compressed air to the rotor assembly 114, the bearings 116, and the turbine section 110 of FIG. 1.

In the depicted embodiment, the valve body 500 includes a first wall 515 that defines the inlet 509 therebetween, and a second wall 517 that defines the outlet 510 therebetween. The first wall 515 preferably includes portions which are parallel to a centerline 521 of the control valve 115 and a step component that is perpendicular to the centerline 521 that helps to define a stop 524 for the poppet 502. The second wall 517 is preferably perpendicular to the centerline 521. As shown in FIGS. 5 and 6, the first wall is a distance 529 from the centerline 521 at its closest point to the centerline 521, and is a distance 530 from the centerline 521 at its farthest point to the centerline 521. For this embodiment, the distance 529 represents a length of an imaginary line that is perpendicular to and terminates at both the centerline 521 and the first wall 515 at its closest point to the centerline 521 the distance 530 represents a length of an imaginary line that is perpendicular to and terminates at both the centerline 521 and the first wall 515 at its farthest point from the centerline 521. Also in the depicted embodiment, the valve body 500 forms a chamber 514 within a portion of the valve body 500, and also forms a vent 516 by which fluid may be vented, for example to an ambient environment.

The sleeve 502 is movably disposed within at least a portion of the valve body 500. The sleeve 502 is movable between at least an open position and a closed position. When the sleeve 502 is in the closed position (depicted in FIG. 5), fluid is restricted from flowing through the fluid flow passage 512. As used herein, fluid is "restricted from flowing" when the flow rate of the fluid is less than ten percent of the flow rate when the sleeve 502 is in the open position. In a most preferred embodiment, the fluid is prevented from flowing through the fluid flow passage 512 when the sleeve 502 is in the closed position. Conversely, when the sleeve 502 is in the open position (depicted in FIG. 6), fluid is allowed to flow freely through the fluid flow passage 512. Specifically, with reference to FIG. 1, the second portion of the compressed air from the compressor section 106 of FIG. 1 is allowed to flow freely through the fluid flow passage 512 toward the rotor assembly 114, the bearings, 116, and the turbine section 110 when the sleeve 502 is in the open position of FIG. 6, but not when the sleeve 502 in the closed position of FIG. 5.

In the depicted embodiment, the sleeve 502 includes a first end, or inner end, 518, and a second end, or outer end, 520. The inner end 518 is disposed relatively closer to the centerline 521 of the control valve 115, and the outer end 520 is disposed relatively farther from the centerline 521.

The sleeve 502 contacts a first seat 524 formed by the valve body 500 when the sleeve 502 reaches the closed position (as depicted in FIG. 5), and the sleeve 502 rests against the first seat 524 when in the closed position. The sleeve 502 contacts a second seat 526 formed by the valve body 500 when the sleeve 502 reaches the open position (as depicted in FIG. 6), and the sleeve 502 rests against the second seat 526 when in the open position.

Also in the depicted embodiment, the sleeve 502 includes an orifice 528 near a middle region of the sleeve 502 surrounding the centerline 521 of the control valve 115. The orifice 528 fluidly couples the inlet 509 with the chamber 514. The orifice 528 allows a relatively small amount of fluid (as compared with the amount of fluid flowing through the fluid flow passage 512 when the sleeve 502 is in the open position) to flow into the chamber 514. This relatively small amount of fluid fills the chamber 514, and pressure balances a portion of the sleeve 502.

The spring 504 is disposed within at least a portion of the valve body 500, and preferably within the chamber 514 allowing for an efficiently packaged assembly. In a preferred embodiment, the spring 504 is nested in the housing 500 within the chamber 514 and surrounded by the sleeve 502, as shown in FIGS. 5 and 6.

The spring 504 exerts a spring force against the sleeve 502. Specifically, the spring 504 exerts the spring force against the sleeve 502 in a first direction that urges the sleeve 502 toward the closed position of FIG. 5. The sleeve 502 receives an inlet flow pressure in a second direction, opposite the first direction, that opposes the spring force and urges the sleeve 502 toward the open position. When the inlet pressure multiplied by the differential area of annulus 523 exceeds the spring force, the sleeve 502 is moved toward the open position. Conversely, when the spring force exceeds the inlet pressure, the sleeve 502 is moved toward the closed position.

The inner radial seal 506 is disposed within the valve body 500 proximate the inner end 518 of the sleeve 502. Specifically, preferably the inner radial seal 506 extends radially around the centerline 521 of the control valve 115 against and adjacent to a portion of the inner end 518 of the sleeve 502 and a portion of the valve body 500, as depicted in FIGS. 5 and 6. The inner radial seal 506 is a distance 531 from the centerline 521. For this embodiment, the distance 531 represents a length of an imaginary line that is perpendicular to and terminates at both the centerline 521 and the inner radial seal 506. In the depicted embodiment, the distance 531 is equal to the distance 529 between the first wall 515 (which forms the inlet 509, as described above) and the centerline 521 at the first wall 515's closest point to the centerline. As the sleeve 520 moves between the open and closed positions, the inner radial seal 506 remains stationary as the sleeve 502 moves adjacent to the inner radial seal 506.

The outer radial seal 508 is disposed against a portion of the valve body 500 proximate the outer end 520 of the sleeve 502. Specifically, preferably the outer radial seal 508 extends radially around the centerline 521 of the control valve 115 against and adjacent to a portion of the outer end 520 of the sleeve 502 and a portion of the valve body 500, as depicted in FIGS. 5 and 6. The outer radial seal 508 is a distance 532 from the centerline 521. For this embodiment, the distance 532 represents a length of an imaginary line that is perpendicular to and terminates at both the centerline 521 and the outer radial seal 508. The outer radial seal 508 is relatively farther from the centerline 521 than is the inner radial seal 506. Alternatively stated, distance 532 is greater than distance 531, and the diameter of the outer radial seal 508 (equal to twice the distance 532) is greater than the diameter of the inner radial seal 506 (equal to twice the distance 531).

The outer radial seal 508 is preferably the same distance from the centerline 521 as is the first wall 515 of the valve body 500 that forms the inlet 509 at the first wall 515's farthest point from the centerline 521. Alternatively stated, distance 532 is preferably equal to distance 530, and the diameter of the outer radial seal 508 (equal to twice the distance 531) is preferably the same as a diameter of the inlet 509 (equal to twice the distance 530). As such, the outer radial seal 508 has the same effective area as the seat region for the control valve 115, and variations in downstream pressure do not affect operation of the control valve 115.

The inner radial seal 506 is a dynamic seal. As the sleeve 502 moves between the open and closed positions, the inner radial seal 506 remains stationary as the sleeve 502 moves along and over the inner radial seal 506.

The inner and outer radial seals 506, 508 are used in parallel to pressure balance a portion of the seat area of the control valve 115 and to prevent leakage or unwanted flow of fluid, for example out the vent 516, between the inner and outer ends 518, 520 of the sleeve 502. Accordingly, the inlet fluid pressure applied against the sleeve 502 is effectively exerted against a region of the sleeve 502 with an area extending a distance 523 between the inner and outer ends 518, 520 of the sleeve 502. As depicted in FIG. 5, the distance 523 is preferably equal to a width of a portion of the sleeve 502 against which the inner and outer radial seals 506, 508 are disposed.

Accordingly, the control valve 115 has a relatively small effective area against which the inlet pressure is applied (as compared with a traditional sleeve control valve), due to the positioning of the inner and outer radial seals 506, 508. In one embodiment, this allows for the control valve 115 to be configured to remain closed until the inlet pressure exceeds a very high threshold, for example during takeoff of an airplane, and also allows for the control valve 115 to fully open very quickly with a large effective area after the inlet pressure exceeds this threshold. This in turn can improve the lifespan of the rotor assembly 114 and the bearings 116 of FIG. 1 and conserve fuel consumption, for example because the rotor assembly 114 and the bearings 116 of FIG. 1 only experience fluid pressure when necessary, for example during takeoff of an airplane.

Similar to the discussion above in connection with FIGS. 2-4, the operating bands of the embodiment of the valve 115 of FIGS. 5 and 6 can similarly be represented with the exemplary operating bands for opening and closing of the control valve 115 in FIG. 4, in accordance with an exemplary embodiment. Similar to the discussion above in connection with FIG. 4, in one exemplary embodiment the control valve 115 of FIGS. 5 and 6 (specifically, the sleeve 502 thereof) begins to open at 80 psi and reaches its fully open position (the position depicted in FIG. 6) at 105 psi. However, this may vary in other embodiments. Also in this exemplary embodiment, the control valve 115 begins to close at 85 psi, and reaches its fully closed position (the position depicted in FIG. 5) at 65 psi. However, this may also vary in other embodiments.

Also similar to the above discussion, in certain embodiments, the first wall 515 of the valve body 500 of the control valve 115 of FIGS. 5 and 6 may be adjusted. For example, an outer portion of the first wall 515 may be moved inward toward the centerline 521, to thereby reduce the distance 530 and correspondingly the diameter of the inlet 509 (which is equal to twice the distance 530). Such movement of the first wall 515 inward toward the centerline 521 would effectively shift the opening and closing curves 402, 404 (for example, by shifting the opening and closing curves 402, 404 closer to one another, in one exemplary embodiment), to thereby adjust the inlet pressures at which the control valve 115 and the sleeve 502 of FIGS. 5 and 6 open and close.

Having generally described the control valve 115, a more detailed description of the operation of a particular embodiment of the control valve 115 will now be described, assuming that the sleeve 502 is initially in the closed position of FIG. 5. In this position, the sleeve 502 is spring loaded against the first seat 524 by the spring 504, and the sleeve 502 experiences inlet pressure against an effective area of the sleeve 502 between the outer radial seal 508 and the inner radial seal 506.

Once sufficient inlet pressure is applied through the inlet 509, the sleeve 502 begins to open against the spring 504 toward the open position of FIG. 6, and fluid begins to flow through the fluid flow passage 512. As the inlet pressure continues to increase and the sleeve 502 reaches a specified point, the sleeve 502 contacts the second seat 526, and the sleeve 502 reaches the open position of FIG. 6. While in the open position, the sleeve 502 rests against the second seat 526, and fluid is allowed to flow freely through the fluid flow passage 512.

Once the inlet pressure is reduced by a sufficient amount, the spring 504 begins to move the sleeve 502 toward the closed position of FIG. 5. As the inlet pressure continues to decrease and the sleeve 502 reaches another specified point, the sleeve 502 contacts the first seat 524, and the sleeve 502 reaches the closed position of FIG. 5. While in the closed position, the sleeve 502 rests against the first seat 524, and fluid is restricted (and preferably prevented) from flowing freely through the fluid flow passage 512. In addition, while the sleeve 502 is in various intermediate positions between the open position of FIG. 6 and the closed position of FIG. 5, fluid is preferably allowed to flow through the fluid flow passage but less freely as compared to when the sleeve 502 is in the fully open position of FIG. 6.

The control valve 115 and the gas turbine engine 100 in the various above-described embodiments provide for effective control of air from the compressor section 106 to the rotor assembly 114, the bearings 116, and the turbine section 110. The configuration of the inner and outer radial seals 206, 208 (and the resulting small effective area of the poppet 202 on which the inlet pressure is applied) allows air to flow to the rotor assembly 114, the bearings 116, and the turbine section 110 only when necessary, for example during takeoff of an airplane and corresponding high inlet pressures, thereby counteracting the thrust on the bearings 116 and improving the longevity of the bearings 116. In addition, this configuration of the inner and outer radial seals 206, 208 allows for a smaller, lightweight spring 204 to be utilized in the control valve 115, and also decreases fuel consumption for the gas turbine engine 100. This configuration also allows for a compact and lightweight design in which the spring is nested within the poppet.

It will be appreciated that the gas turbine engine 100, the control valve 115, and/or various components thereof may vary in different embodiments. It will similarly be appreciated that the control valve 115 and/or the gas turbine engine 100 may be implemented in connection with any number of different types of aircraft, spacecraft, other types of vehicles, and/or other types of devices and/or systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A gas turbine engine comprising:
   a compressor having an inlet and an outlet and operable to supply compressed air;
   a combustor coupled to receive a first portion of the compressed air from the compressor and operable to supply combusted air;
   a turbine coupled to receive the combusted air from the combustor and a second portion of the compressed air from the compressor; and
   a control valve coupled between the compressor and the combustor, the control valve comprising:
   a valve body forming an inlet, an outlet, and a fluid flow passage therebetween;
   a valve element disposed at least partially within the valve body and movable between at least:
      a closed position, in which fluid is restricted from flowing through the fluid flow passage; and
      an open position, in which the fluid is allowed to flow through the fluid flow passage;
   an inner radial seal disposed against the valve body at a first distance from a centerline of the control valve, the first distance comprising a shortest distance between the inner radial seal and the centerline; and
   an outer radial seal disposed against the valve body at a second distance from the centerline, the second distance comprising a shortest distance between the outer radial seal and the centerline, the second distance being greater than the first distance, wherein the difference between the second distance and the first distance is less than the first distance;
   wherein the inner radial seal and the outer radial seal are axially aligned with one another along the centerline of the control valve.

2. The gas turbine engine of claim 1, further comprising:
   a spring disposed at least partially within the valve body and configured to exert a spring force against the valve element urging the valve element toward the closed position;
   wherein:
      the valve element is further configured to receive an inlet pressure opposing the spring force and urging the valve element toward the open position;
      the valve body forms a chamber in which the spring is disposed; and
      the valve element includes an orifice allowing some of the fluid to flow into the chamber.

3. The gas turbine engine of claim 1, wherein:
   the valve element has an inner end and an outer end;
   the inner radial seal extends radially around the centerline against the inner end; and
   the outer radial seal extends radially around the centerline against the outer end.

4. The gas turbine engine of claim 1, wherein:
   the valve element comprises a poppet;
   the inner seal seals on an inner diameter of the poppet; and
   the outer seal seals on an outer diameter of the poppet.

5. The gas turbine engine of claim 4, wherein:
   the poppet includes a protrusion; and
   the valve body forms:
      a first seat that contacts the protrusion when the valve element reaches the closed position; and
      a second seat that contacts the protrusion when the valve element reaches the open position.

6. The gas turbine engine of claim 1, wherein:
   the valve element comprises a sleeve;
   the inner seal seals on an inner diameter of the sleeve; and
   the outer seal seals on an outer diameter of the sleeve.

7. The gas turbine engine of claim 1, wherein the valve body includes a first wall defining the inlet, the first wall being a third distance from the centerline, the third distance comprising a shortest distance between the first wall and the centerline, the third distance being substantially equal to the second distance.

8. The gas turbine engine of claim 1, wherein:
   the inner radial seal is disposed within the valve body; and
   the outer radial seal is disposed within the valve element.

9. A gas turbine engine comprising:
   a compressor having an inlet and an outlet and operable to supply compressed air;
   a combustor coupled to receive a first portion of the compressed air from the compressor and operable to supply combusted air;
   a turbine coupled to receive the combusted air from the combustor and a second portion of the compressed air from the compressor; and
   a control valve coupled between the compressor and the combustor, the control valve comprising:
   a valve body forming an inlet, an outlet, and a fluid flow passage therebetween;
   a valve element disposed in the valve body, the valve element having a solid cylindrical wall having an inner end and an outer end that is opposite the inner end, the valve element movable between at least:
      a closed position, in which fluid is restricted from flowing through the fluid flow passage; and
      an open position, in which the fluid is allowed to flow through the fluid flow passage;
   a first radial seal disposed against the inner end of the solid cylindrical wall of the valve element; and a second radial seal disposed against the outer end of the solid cylindrical wall of the valve element,
wherein the first radial seal and the second radial seal are axially aligned with one another along a centerline of the control valve.

10. The gas turbine engine of claim 9, wherein:
the first radial seal is a first distance from a centerline of the control valve, the first distance comprising a shortest distance between the first radial seal and the centerline; and
the second radial seal is a second distance from the centerline, the second distance being greater than the first distance, the second distance comprising a shortest distance between the second, the first distance comprising a shortest distance between the first radial seal and the centerline radial seal and the centerline, wherein the difference between the second distance and the first distance is less than the first distance.

11. The gas turbine engine of claim 9, wherein:
the inner radial seal seals on an inner diameter of the valve element; and
the outer radial seal seals on an outer diameter of the valve element.

12. The gas turbine engine of claim 9, wherein a first imaginary line that is perpendicular to and terminates at both the centerline and the outer radial seal is longer than, is the same direction as, and intersects a second imaginary line that is perpendicular to and terminates at both the centerline and the inner radial seal.

13. A gas turbine engine, comprising:
a compressor having an inlet and an outlet and operable to supply compressed air;
a combustor coupled to receive a first portion of the compressed air from the compressor and operable to supply combusted air;
a turbine coupled to receive the combusted air from the combustor and a second portion of the compressed air from the compressor; and
a control valve coupled between the compressor and the combustor, the control valve comprising:
a valve body forming an inlet, an outlet, and a fluid flow passage therebetween;
a valve element disposed at least partially within the valve body and movable between at least:
a closed position, in which the second portion of the compressed air is restricted from flowing through the fluid flow passage; and
an open position, in which the second portion of the compressed air is allowed to flow through the fluid flow passage;
a first radial seal disposed against the valve body at a first distance from a centerline of the control valve, the first distance comprising a shortest distance between the first radial seal and the centerline; and
a second radial seal disposed against the valve body at a second distance from the centerline, the second distance comprising a shortest distance between the second radial seal and the centerline the second distance being greater than the first distance, wherein the first radial seal and the second radial seal are axially aligned with one another along the centerline of the control valve;
wherein the valve body includes a first wall defining the inlet, the first wall being a third distance from the centerline, the third distance comprising a shortest distance between the first wall and the centerline, the third distance being equal to the second distance.

14. The gas turbine engine of claim 13, wherein:
the first radial seal seals on an inner diameter of the valve element; and
the second radial seal seals on an outer diameter of the valve element.

15. The gas turbine engine of claim 13, wherein:
the valve element comprises a solid cylindrical wall having an inner end and an outer end;
the first radial seal is disposed against the inner end; and
the second radial seal is disposed against the outer end, such that the first and second radial seals are disposed against opposing sides of the solid cylindrical wall.

16. The gas turbine engine of claim 13, wherein the difference between the second distance and the first distance is less than the first distance.

17. The gas turbine engine of claim 13, wherein the valve body further includes a second wall, opposite the first wall, further defining the inlet between the first and second walls, the second wall being a fourth distance from the centerline, the fourth distance comprising a shortest distance between the second wall and the centerline, the fourth distance being equal to the second distance.

18. The gas turbine engine of claim 13, wherein the valve body further includes a second wall, opposite the first wall, further defining the inlet between the first and second walls, the second wall being a fourth distance from the centerline, the fourth distance comprising a shortest distance between the second wall and the centerline, the fourth distance being equal to the first distance.

19. The gas turbine engine of claim 13, wherein:
the valve body further includes a second wall and a third wall, both opposite the first wall, further defining the inlet between the first wall on a first side and the second and third walls on an opposite second side;
the second wall is a fourth distance from the centerline, the fourth distance comprising a shortest distance between the second wall and the centerline, the fourth distance being equal to the first distance; and
the third wall is a fifth distance from the centerline, the fifth distance comprising a shortest distance between the third wall and the centerline, the fifth distance being equal to the second distance.

20. The gas turbine engine of claim 9, wherein the first radial seal and the second radial seal are axially aligned with one another.

* * * * *